US008587432B2

(12) United States Patent
Mulla

(10) Patent No.: US 8,587,432 B2
(45) Date of Patent: Nov. 19, 2013

(54) ELECTRONIC ARTICLE SURVEILLANCE SYSTEMS, APPARATUS, AND METHODS

(75) Inventor: Altaf Mulla, Potomac, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 540 days.

(21) Appl. No.: 12/860,673

(22) Filed: Aug. 20, 2010

(65) Prior Publication Data

US 2012/0044074 A1 Feb. 23, 2012

(51) Int. Cl.
*G08B 13/14* (2006.01)

(52) U.S. Cl.
USPC ........... 340/572.1; 340/572.4; 340/572.7; 340/572.8; 340/10.1; 340/10.51; 340/506; 342/429; 342/445

(58) Field of Classification Search
USPC ............ 340/572.1–572.8, 10.1, 10.51, 505; 342/429, 445
See application file for complete search history.

(56) References Cited

U.S. PATENT DOCUMENTS

| 6,752,837 | B2 * | 6/2004 | Karp | 340/572.1 |
|---|---|---|---|---|
| 7,042,359 | B2 * | 5/2006 | Clucas | 340/572.1 |
| 7,081,815 | B2 * | 7/2006 | Runyon et al. | 340/541 |
| 7,527,198 | B2 * | 5/2009 | Salim et al. | 235/385 |
| 2007/0046470 | A1 | 3/2007 | Pempsell et al. | |
| 2007/0126555 | A1 | 6/2007 | Bandy | |
| 2007/0200712 | A1 | 8/2007 | Arneson et al. | |
| 2008/0122632 | A1 | 5/2008 | Copeland | |
| 2008/0136635 | A1 | 6/2008 | Malik | |
| 2008/0180248 | A1 | 7/2008 | Lian et al. | |
| 2009/0021376 | A1 | 1/2009 | Calvarese | |
| 2009/0128334 | A1 | 5/2009 | Starr et al. | |
| 2009/0189768 | A1 | 7/2009 | Copeland et al. | |
| 2009/0224918 | A1 | 9/2009 | Copeland | |
| 2010/0123547 | A1 | 5/2010 | Stevenson et al. | |
| 2010/0127828 | A1 | 5/2010 | Connolly et al. | |
| 2011/0095892 | A1 * | 4/2011 | Hong et al. | 340/572.7 |

OTHER PUBLICATIONS

PCT International Search Report Dated Aug. 9, 2011 for Counterpart Application.

* cited by examiner

*Primary Examiner* — Tai T Nguyen
(74) *Attorney, Agent, or Firm* — Terri H. Smith; Kenneth A. Haas

(57) ABSTRACT

Embodiments include methods and apparatus for detecting proximity of an electronic article surveillance (EAS) tag. A proximity detection system (e.g., a radio frequency identification (RFID) tag reader) detects a presence of an object within a first area. In response to detecting the proximity of the object, an EAS tag reader alters characteristics of an EAS tag detection signal that is produced by the EAS tag reader in order to detect an EAS tag within range of the EAS tag reader.

17 Claims, 7 Drawing Sheets

US 8,587,432 B2

ELECTRONIC ARTICLE SURVEILLANCE SYSTEMS, APPARATUS, AND METHODS

TECHNICAL FIELD

Embodiments of the present invention generally relate to electronic article surveillance systems and methods of their operation.

BACKGROUND

The use of electronic article surveillance (EAS) systems for article theft detection has been widely adopted by retailers and other entities (e.g., libraries). In the retail context, these systems include special tags that are activated and affixed to articles for which theft detection is desired, along with tag detectors having transmit and receive antennas that typically are positioned at exits of a retail store. When an article is purchased, a store clerk deactivates or removes the tag at the point-of-sale (e.g., a cash register area), and the article may be carried past the tag detector without triggering an alarm. However, when an active tag (i.e., a tag that has not been deactivated) is carried past a tag detector, and the tag detector successfully detects the active tag, the EAS system generates an audible alarm to alert store personnel to a potential theft of an article to which the tag is attached.

Several types of EAS systems are prevalently used. For example, an acousto-magnetic EAS system includes a detector with a transmitter configured to emit periodic activation pulses at a given frequency (e.g., about 50-90 pulses at 58 kilohertz (kHz)) during an activation phase, and magnetic tags that emit oscillating signals in response to encountering activation pulses of sufficient power. Essentially, the activation pulses energize the tag during the activation phase, and the tag continues to emit the oscillating signals even after the activation signal is discontinued. When the tag is within range of the detector and the detector is in a detection phase, the oscillating signal produced by the tag induces an AC voltage in a receive antenna of the detector. When the induced signal meets predefined detection parameters (e.g., the detected signal has a frequency of 58 kHz and is time-synchronized with the transmitter), the system may produce an audible alarm.

In contrast, each tag of a swept radio frequency (RF) EAS system includes circuitry with a resonance peak within a certain frequency range (e.g., from 1.75 to 9.5 megahertz (MHz), with 8.2 MHz being most popular). A transmitter of the system's detector transmits a relatively high-powered signal that sweeps around the pre-defined resonant frequency, and the tag responds by emitting a signal that may be detected by a wideband receiver of the detector when the tag is within a detection zone (e.g., an RF range of the detector). By detecting a phase difference between the transmitted and received signals, the receiver recognizes the presence of the tag within the detection zone, and the system produces an audible alarm.

Conventional EAS systems have been successful at deterring and detecting article theft. However, current systems suffer from some significant drawbacks. For example, a typical EAS detector includes a first pedestal to house the detector's transmit antenna, and a second pedestal to house the detector's receive antenna. Tag detection is possible when an EAS tag is carried between the transmit and receive pedestals. Accordingly, the transmit and receive pedestals are placed in proximity to a portal (e.g., a retail store exit) at a distance from each other that is governed by the signal characteristics of the detector. Current regulatory restrictions on a detector's transmitted signal characteristics, along with practical size limitations for EAS tags, mandate a relatively small distance between a detector's transmit and receive antennas (i.e., the distance between the transmit pedestal and the receive pedestal). Accordingly, when a portal is wider than the mandated distance, multiple pedestal pairs are needed in order to span the entire extent of the portal. The pedestal portions of current EAS systems are relatively expensive, and the necessity for multiple pedestal pairs to span a relatively wide portal increases the cost to the retailer of adopting such an EAS system. Additionally, the installation of multiple pedestal pairs may compromise the storefront aesthetics, and the pedestals may impede customer traffic at the front of the store. Accordingly, a retailer may decide not to purchase an EAS system when the system cost exceeds the perceived, potential benefit of theft deterrence/detection and/or when the retailer decides that the pedestals unacceptably compromise the storefront aesthetics or traffic flow.

An additional drawback to conventional EAS systems is that regulatory restrictions on EAS systems' transmit signal power result in EAS systems in which an EAS tag is detectable only when the EAS tag is located a relatively short distance from a pedestal pair. Typically, EAS tag detection is possible only when the EAS tag is very close to the pedestals and the store exit, and an individual carrying an active EAS tag may have exited the store before the EAS system alarm sounds, and store or security personnel are alerted. Accordingly, conventional EAS system operations often leave insufficient time or opportunity for store personnel to respond to a tag detection alarm (e.g., by apprehending an individual that is leaving a store with an active EAS tag).

In addition, conventional EAS systems are relatively inefficient with respect to power consumption. For example, as long as an EAS system is on (e.g., during a retail store's hours of operation), a conventional EAS detector continues to emit activation pulses (in the case of an acousto-magnetic EAS system) or to produce swept-RF signals (in the case of a swept RF EAS system). Accordingly, the EAS detector continuously consumes power while the system is on, regardless of whether or not an article theft potentially is occurring. Accordingly, what are needed are EAS systems and methods of their operation that overcome such drawbacks of conventional EAS systems.

BRIEF DESCRIPTION OF THE DRAWINGS

Embodiments of the present invention will hereinafter be described in conjunction with the following drawing figures, wherein like numerals denote like elements.

DETAILED DESCRIPTION

Embodiments include methods and apparatus for performing electronic article surveillance (EAS). An embodiment of a reader system includes a proximity sensor system and an EAS tag reader, which interact with one or more tags to detect the presence of an object (to which the tag(s) are attached) within an area. More specifically, the proximity sensor system is configured to detect a presence of an object within a first area, in an embodiment. The proximity sensor system may be, for example but not by way of limitation, a radio frequency identification (RFID) tag reader, a motion detection system, an optical sensor system, a camera, or a laser sensor system. The EAS tag reader is configured to make a transition from a first operational mode to a second operational mode in response to detecting the object within the first area. According to an embodiment, the transition includes the EAS tag reader altering production of an EAS tag detection signal. For example, the EAS tag reader may transition from a mode in which it does not produce an EAS tag detection signal at all, to a mode in which it produces an EAS tag detection signal, in an embodiment. Alternatively, the EAS tag reader may transition from a mode in which it produces an EAS tag detection signal having first transmission characteristics (e.g., a first duty cycle, pulse frequency, and power) to a mode in which it produces an EAS tag detection signal having second and different transmission characteristics (e.g., a second duty cycle, pulse frequency, and/or power). In general, the second transmission characteristics may be selected to increase the probability of detecting an EAS tag within range of the EAS tag reader while achieving regulatory compliance, when compared with the probability of detection using an EAS tag detection signal having the first transmission characteristics.

Figure 1:
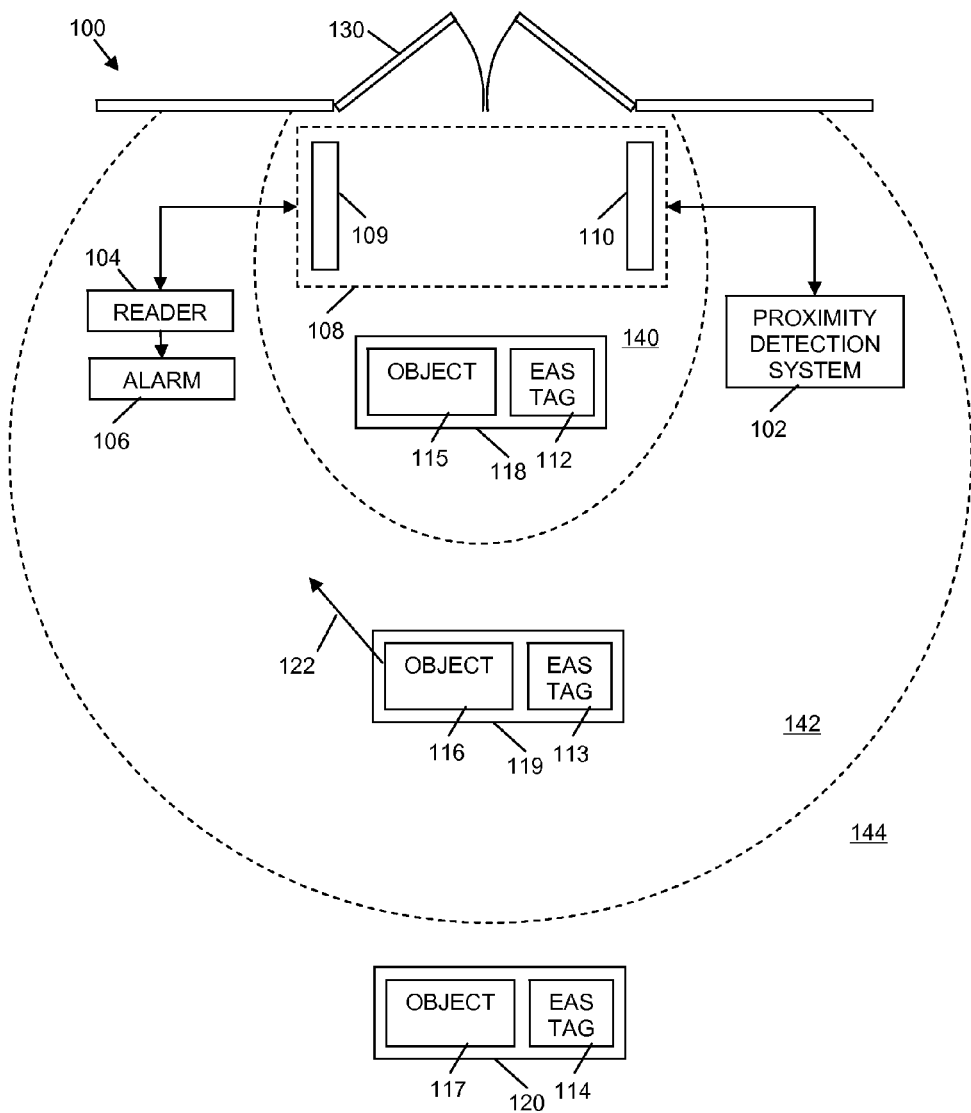
FIG. 1 is a top view of an electronic article surveillance (EAS) system and associated detection ranges, in accordance with an embodiment.

FIG. 1 is a top view of an EAS system 100 and associated detection areas 140, 142, in accordance with an embodiment. EAS system 100 includes a proximity detection system 102, an EAS tag reader 104, an alarm 106, a pedestal pair 108, and at least one tag 112, 113, 114. The pedestal pair 108 is operatively coupled with the EAS tag reader 104, and includes a transmit pedestal 109 and a receive pedestal 110. The transmit pedestal 109 includes a transmit antenna associated with the EAS tag reader 104, and the receive pedestal 110 includes a receive antenna associated with the EAS tag reader 104. The transmit and receive pedestals 109, 110 are positioned in proximity to a portal 130, and are spatially separated so that the transmit pedestal 109 is proximate one side of the portal 130, and the receive pedestal 110 is proximate the opposite side of the portal 130. Accordingly, the space between the transmit and receive pedestals 109, 110 corresponds to a path of egress (e.g., a path between the interior of a retail store to the exterior of the retail store).

Although only one pedestal pair 108 is illustrated in FIG. 1, it should be understood that several pedestal pairs may be included in the system 100. For example, when the portal 130 has a length that is longer than the distance mandated by the characteristics of the EAS tag interrogation signal, more than one pedestal pair may be used to span the length of the portal 130. Alternatively, multiple portal pairs may be used to monitor multiple portals.

The proximity detection system 102 is communicatively coupled with the EAS tag reader 104, and depending on the particular embodiment, the proximity detection system 102 may or may not be coupled with the pedestal pair 108. As will be explained more fully below, the proximity detection system 102 is configured to detect the presence of an object 115, 116, 117 within a first area 142, in an embodiment. The proximity detection system 102 may comprise, for example, an RFID tag reader, wherein the "object" 115-117 takes the form of an RFID tag configured to interact with the RFID tag reader to enable the RFID tag reader to determine whether the RFID tag is within the first area 142. For example, the RFID tag may be an RFID tag selected from a group consisting of an active RFID tag, a passive RFID tag, and a battery-assist passive RFID tag. In various alternate embodiments, the "object" 115-117 may be a person or an article to which the EAS tag 112-114 is attached. In such embodiments, the proximity detection system 102 may be any of a motion detection system, an optical sensor system, a camera, or a laser sensor system, which are configured either to detect motion of the object 115-117 while it is within the first area 142, the entry of the object 115-117 into the first area 142, or the presence of the object 115-117 within the first area 142. In such embodiments, the proximity detection system 102 includes a "sensor" configured to detect the motion, entry, or presence of the object 115-117 within the first area 142.

In the embodiment in which the object 115-117 is an RFID tag, the first area 142 corresponds to an RF range of the RFID tag reader. More specifically, the first area 142 corresponds to an RF range of transmit and receive antennas of the RFID tag reader, which may be physically located in or on one or both pedestals 109, 110 of the pedestal pair 108. For example, object 117 (e.g., a first RFID tag) is located in area 144, which is outside of the first area 142. Accordingly, object 117 may be considered to be outside the detection range of proximity detection system 102 (and EAS tag reader 104). Conversely, object 116 (e.g., a second RFID tag) is located within area 142, and may be considered to within the detection range of proximity detection system 102.

As will be explained in more detail below, when proximity detection system 102 detects an object (e.g., object 115 or 116) within the first area 142, proximity detection system 102 may generate a "proximity signal," which is communicated to EAS tag reader 104, in an embodiment. Alternatively, proximity detection system 102 may be configured to produce the proximity signal only upon detection of the presence of the object within area 142 combined with a detection of motion of the object (e.g., as indicated by arrow 122 associated with object 116). Either way, upon receipt of the proximity signal (or merely in response to detecting an object within area 142), EAS tag reader 104 makes a transition from a first operational mode to a second operational mode. The transition includes the EAS tag reader 104 altering production of an EAS tag detection signal. As used herein, an "EAS tag detection signal" may be any signal produced by any of several types of EAS tag reader (including acousto-magnetic EAS tag readers and swept RF EAS tag readers), which facilitates the detection of an EAS tag (e.g., EAS tags 112-114) within range of the transmit and receive antennas of an EAS tag reader 104.

Figure 6:
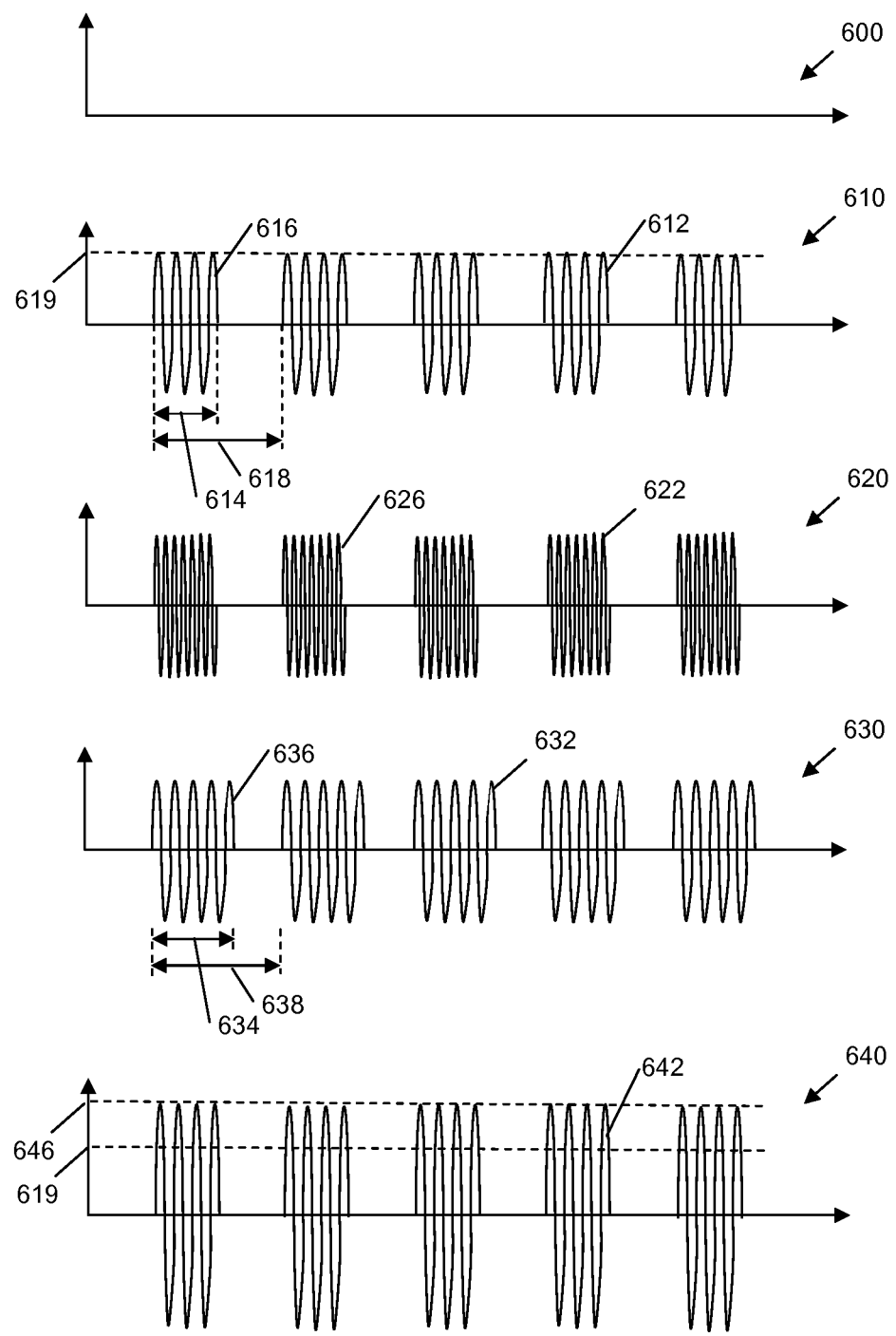
FIG. 6 illustrates EAS detection signals produced in first and second operational modes, in accordance with various example embodiments.

For example, the EAS tag reader 104 may transition from a mode in which it does not produce an EAS tag detection signal at all (e.g., as indicated by the absence of an EAS tag detection signal in graph 600, FIG. 6), to a mode in which it produces an EAS tag detection signal (e.g., a signal such as one of the EAS tag detection signals 612, 622, 632, 642 in graphs 610, 620, 630, 640, FIG. 6), in an embodiment. Alternatively, EAS tag reader 104 may transition from a mode in which it produces an EAS tag detection signal having first transmission characteristics (e.g., a first duty cycle, pulse frequency, and power, such as EAS tag detection signal 612 in graph 610, FIG. 6) to a mode in which it produces an EAS tag detection signal having second and different transmission characteristics (e.g., a second duty cycle, pulse frequency, and/or power, such as one of the EAS tag detection signals 622, 632, 642 in graphs 620, 630, 640, FIG. 6). In general, the second transmission characteristics may be selected to increase the probability of detecting an EAS tag within range of the EAS tag reader 104, when compared with the probability of detection using an EAS tag detection signal having the first transmission characteristics. For example, when compared with EAS tag detection signal 612 in graph 610, FIG. 6, each of EAS tag detection signals 622, 632, 642 in graphs 620, 630, 640, FIG. 6 may have a higher probability of detection, as they have a higher pulse frequency, higher duty cycle, and higher power, respectively, than EAS tag detection signal 612. The EAS tag signal produced in the second operational mode may have any combination of higher frequency, higher duty cycle, and power, in various embodiments. In addition to providing potential benefits relating to increasing the probability of detection while the EAS tag reader 104 is in the second operational mode, the overall power consumption of the EAS tag reader 104 may be significantly lower. In an embodiment, the amount of power consumed by the EAS tag reader 104 is low while the EAS tag reader 104 is in the first operational mode, since either the EAS tag reader 104 is not producing an EAS tag detection signal at all or the EAS tag detection signal produced may be of relatively low power, when compared with the EAS tag detection signal produced while the EAS tag reader 104 is in the second operational mode.

According to an embodiment, the EAS tag signal produced in the second operational mode not only may increase the probability of detection, but also may increase a range of detection by the EAS reader 104. Accordingly, such embodiments provide an "early warning" system that may enable detection of an EAS tag at a distance that is farther from a pedestal pair than is possible with conventional EAS tag detection techniques. More particularly, using an embodiment of the inventive subject matter, the system may produce an alarm to alert store personnel about the approach of an active EAS tag to a pedestal pair when the EAS tag is farther from the pedestal pair, and thus at a time that is earlier than a time that an alarm would be produced using conventional EAS tag detection techniques. Accordingly, store personnel may have more time to apprehend an individual carrying an active EAS tag toward an exit, thus improving loss prevention.

In an embodiment such as that depicted in FIG. 1, in which the transmit and receive antennas are incorporated into transmit and receive pedestals 109, 110 of a pedestal pair 108, the detection area for the EAS tag reader 104 is an area 140 proximate to the pedestal pair 108. According to an embodiment, the detection range of the proximity detection system 102 is significantly farther than the detection range of the EAS tag reader 104. For example, the detection range of EAS tag reader 104 may be in a range of about 3 meters or less, and depending on the type of proximity detection employed by proximity detection system 102, the detection range of proximity detection system 102 may be in a range of about 10 to 50 meters. In alternate embodiments, the detection ranges of EAS tag reader 104 and/or proximity detection system 102 may be larger or smaller than the above given values and ranges. The detection area 140 of EAS tag reader 104 may completely overlap the detection area 142 of proximity detection system 102, as shown in FIG. 1. Alternatively, the detection areas 140, 142 may only partially overlap or may not overlap at all, depending on the configuration of the portal 130 and the placement of the transmit/receive antennas or sensor associated with the proximity detection system 102, with respect to the portal pair 108.

With the difference in detection ranges, the detection area 142 of proximity detection system 102 may be significantly larger than the detection area 140 of EAS tag reader 104. This enables the presence of an object 115-117 with which the EAS tag 112-114 is associated (e.g., attached) to be detected earlier than would be possible using only EAS tag reader 104. In addition, as will be explained in more detail later, this enables the EAS tag reader 104 to be operated in a less power consumptive mode in the absence of any detected object within area 142, while allowing a transition to operation in a more accurate detection mode in the presence of a detected object within area 142. As mentioned above, this enables the EAS tag reader 104 to be operated in a mode that increases the EAS tag detection area. Thus, an alarm produced upon detection of an active EAS tag may be produced earlier than it would be using a conventional EAS system, and store personnel or security staff may have more time to respond to the alarm (e.g., to apprehend an individual carrying the EAS tag before the individual exits the premises).

In an embodiment in which EAS tag reader 104 is an acousto-magnetic EAS system, a transmitter and transmit antenna (e.g., within transmit pedestal 109) of EAS tag reader 104 are configured to emit the EAS tag detection signal in the form of periodic activation pulses at a given frequency during an activation phase, and a receiver and receive antenna (e.g., within receive pedestal 110) of EAS tag reader 104 are configured to receive oscillating signals emitted from an EAS tag (e.g., EAS tag 112) in response to encountering activation pulses of sufficient power. As discussed previously, the activation pulses energize the tag during the activation phase, and the tag continues to emit the oscillating signals even after the activation signal is discontinued. When the tag is within range of the receive antenna of EAS tag reader 104 (e.g., the EAS tag 112 is within detection area 140) and the EAS tag reader is in a detection phase, the oscillating signal produced by the tag induces an AC voltage in the receive antenna (e.g., within receive pedestal 110) of the EAS tag reader 104. When the induced signal meets predefined detection parameters (e.g., the detected signal has a frequency of 58 kHz and is time-synchronized with the transmitter), the EAS tag reader 104 may produce a control signal, which causes alarm 106 to produce an audible alarm. In this manner, object 115 may be considered to be within the detection range of both the proximity detection system 102 and the EAS reader 104 when object 115 (and EAS tag 112) are within area 140.

In an embodiment in which EAS tag reader 104 is a swept RF EAS system, a transmitter and transmit antenna (e.g., within transmit pedestal 109) of EAS tag reader 104 are configured to emit the EAS tag detection signal in the form of a relatively high-powered signal that sweeps around the predefined resonant frequency, and a receiver and receive antenna (e.g., within receive pedestal 110) of EAS tag reader 104 are configured to receive oscillating signals emitted from an EAS tag (e.g., EAS tag 112) in response to encountering activation pulses of sufficient power. As discussed previously, the activation pulses energize the tag during the activation phase, and the tag continues to emit the oscillating signals even after the activation signal is discontinued. When the tag is within range of the receive antenna of EAS tag reader 104 (e.g., the EAS tag 112 is within detection area 140) and the EAS tag reader is in a detection phase, the oscillating signal produced by the tag induces an AC voltage in the receive antenna (e.g., within receive pedestal 110) of the EAS tag reader 104. When the induced signal meets predefined detection parameters (e.g., the detected signal has a frequency of 58 kHz and is time-synchronized with the transmitter), the EAS tag reader 104 may produce a control signal, which causes alarm 106 to produce an audible alarm. In this manner, object 115 may be considered to be within the detection range of both the proximity detection system 102 and the EAS reader 104 when object 115 (and EAS tag 112) are within area 140.

Each EAS tag (e.g., EAS tag 112) includes circuitry with a resonance peak within a certain frequency range (e.g., from 1.75 to 9.5 MHz), with 8.2 MHz being preferred, in an embodiment), and an EAS tag responds to the swept RF signal produced by the transmitter by emitting a signal that may be detected by a wideband receiver of the EAS tag reader 104 when the EAS tag is within a detection zone 140 (e.g., an RF range of the detector). The EAS tag reader 104 detects a phase difference between the transmitted and received signals. When the EAS tag reader 104 recognizes the presence of the EAS tag (e.g., EAS tag 112) within the detection zone 140, the EAS tag reader 104 may produce a control signal, which causes alarm 106 to produce an audible alarm. Once again, in this manner, object 115 may be considered to be within the detection range of both the proximity detection system 102 and the EAS reader 104 when object 115 (and EAS tag 112) are within area 140.

EAS tags 112-114 may be housed within a housing or container 118, 119, 120 of some type, according to various embodiments. For example, EAS tags 112-114 may be housed in a relatively durable plastic housing, which may be adhered or otherwise attached to an object. When objects 115-117 are RFID tags, the RFID tags may be housed within the same housings or containers as the EAS tags 112-114, as shown in FIG. 1. Alternatively, the RFID tags may be housed within different housings or containers from the EAS tags 112-114.

According to various embodiments, a container 118-119 may be any one of a bag, a box, a package, a crate, a pallet, or another type of container. In such an embodiment, the RFID tags (e.g., objects 115-117) may be integrally formed with or otherwise attached or integrated with container 118-119. In further embodiments, EAS tags 112-114 also or alternatively may be integrally formed with or otherwise attached to or integrated with container 118-119. In such embodiments, when a retail article is purchased, the retail store clerk may deactivate the RFID tags and EAS tags 112-114 by performing a deactivation process to a bag (e.g., a container 118-120) within which the store clerk will place the purchased article for presentation to the purchaser.

Figure 2:
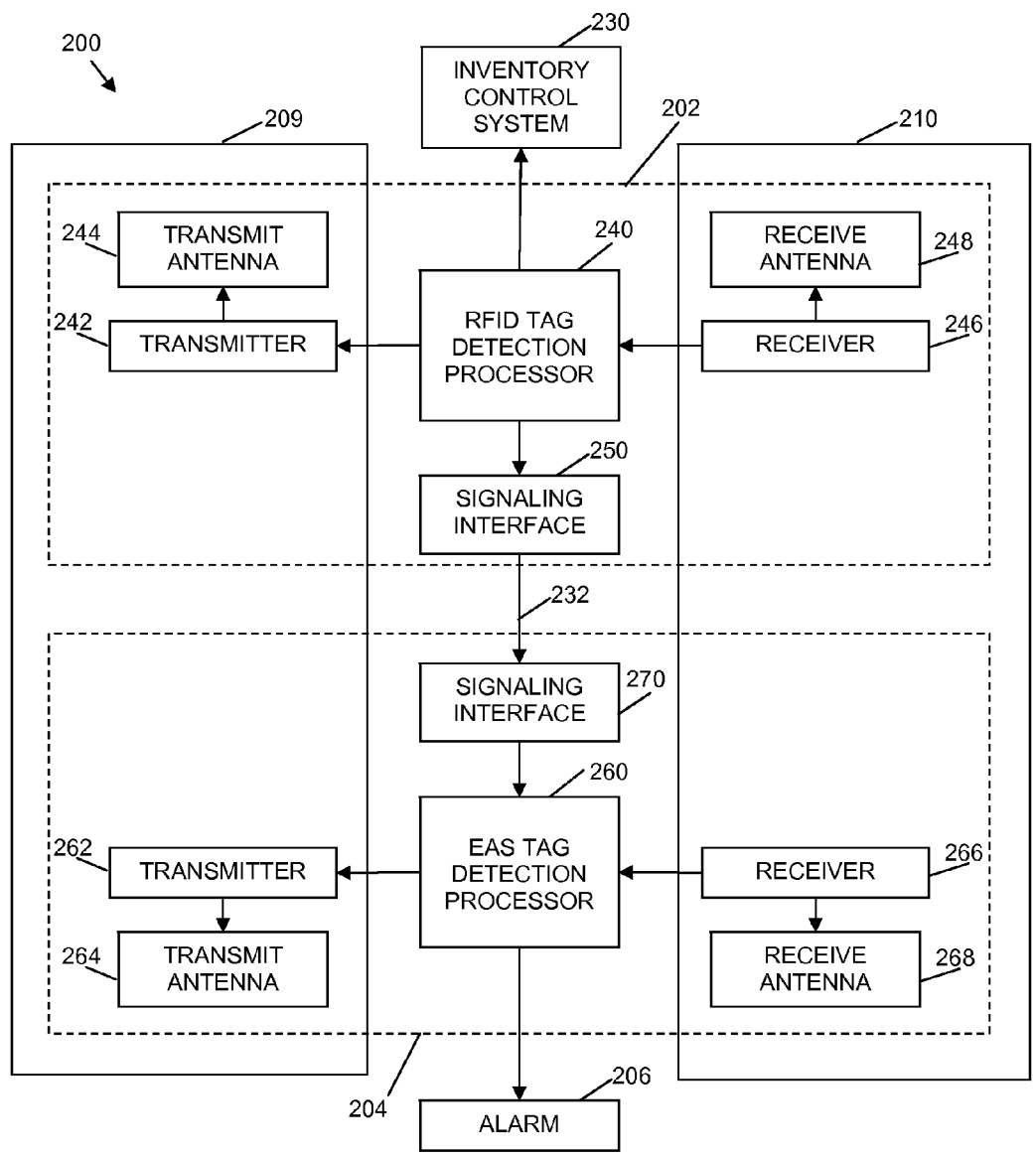
FIG. 2 is a simplified block diagram of an EAS system, in accordance with an example embodiment.

FIG. 2 is a simplified block diagram of an EAS system 200, in accordance with an example embodiment. More particularly, the embodiment relates to an EAS system 200 that includes an RFID tag reader 202 as a proximity detection system (e.g., proximity detection system 102, FIG. 1), and the RFID tag reader 202 is implemented using distinct hardware from EAS tag reader 204 (e.g., EAS tag reader 104, FIG. 1). EAS system 200 includes the RFID tag reader 202, the EAS tag reader 204, an alarm 206, and a pedestal pair consisting of a transmit pedestal 209 and a receive pedestal 210. In addition, as will be discussed in more detail later, the RFID tag reader 202 may be communicatively coupled with an inventory control system 230.

RFID tag reader 202 is configured to detect a presence of an RFID tag (e.g., object 115 or 116, FIG. 1) within a first detection area (e.g., area 142, FIG. 1), and to generate a proximity signal 232 in response to detecting the RFID tag within the first area. RFID tag reader 202 includes an RFID tag detection processor 240, a transmitter 242, a transmit antenna 244, a receiver 246, a receive antenna 248, and a signaling interface 250. The transmit antenna 244 (and possibly transmitter 242) may be housed within transmit pedestal 209, and the receive antenna 248 (and possibly receiver 246) may be housed within receive pedestal 210, although this is not a requirement. In an alternate embodiment, the transmit antenna 244 and/or receive antenna 248 may be located elsewhere.

RFID tag detection processor 240 includes one or more general or special purpose processors and associated memory and other circuitry, which enables RFID tag detection processor 240 to execute an RFID tag detection algorithm. The particular RFID tag detection algorithm depends on the type of RFID tag employed in the system. For example, in various embodiments, the RFID tag detection algorithm is configured to communicate with an RFID tag selected from a group consisting of an active RFID tag, a passive RFID tag, and a battery-assist passive RFID tag. Each of these types of RFID tags includes an integrated circuit for storing information (e.g., an article identifier), processing RFID tag interrogation signals from RFID tag reader 202, and transmitting an RFID tag response signal that includes the stored information. An RFID tag also may be programmable to store the transaction status of an item (i.e., whether the item is "transacted" (paid-for and sold) or "non-transacted" (not yet paid for or sold)). When an RFID tag initially is attached to an item and offered for sale, the transaction status may be initialized to "non-transacted," and when the item is sold, equipment at the point-of-sale may be used to change the stored transaction status to "transacted." An active RFID tag includes a battery, and is capable of transmitting a signal autonomously. In contrast, a passive RFID tag does not include a battery, and requires an external source (e.g., RFID tag reader 202) to provoke signal detection. A battery-assisted passive RFID tag, on the other hand, requires an external source to wake up, although it has a significant higher forward link capability, thus providing greater range.

According to an embodiment, the RFID tag detection algorithm includes invoking the transmitter 242 and transmit antenna 244 to radiate an RFID tag interrogation signal, and evaluating signals received via receive antenna 248 and receiver 246 to determine whether they are valid RFID tag response signals. According to an embodiment, when a valid RFID tag interrogation signal is received, the RFID tag detection algorithm is configured to produce the proximity signal 232, which is communicated to the EAS tag detector 204 via signaling interface 250.

According to an embodiment, the RFID tag detection algorithm is also configured to detect whether the responding RFID tag is in motion, although this is not a requirement. In such an embodiment, the RFID tag reader 202 may produce the proximity signal 232 only upon detecting that the RFID tag is in motion. In a further embodiment, the RFID tag reader 202 may produce the proximity signal 232 upon detecting that the RFID tag is in motion and the direction of motion is toward the portal (i.e., the RFID tag is approaching the portal, as opposed to moving away from the portal). These features have an advantage of allowing RFID and EAS tags to be attached to articles that are displayed or stored within the RFID detection range (e.g., within area 142, FIG. 1) without causing the RFID tag reader 202 to send the proximity signal 232 and trigger the EAS tag reader 204 to change its mode of operation. Because a purpose of EAS system 200 is to detect potential theft of articles, it is desirable to detect EAS tags on articles that are in motion (e.g., being carried out of the retail store by a shoplifter), rather than to detect EAS tags on articles that are stationary (e.g., on display in proximity to a portal).

In addition, in an embodiment, the RFID tag detection algorithm is configured to provide information received in the RFID tag response signals to inventory control system 230 when an RFID tag associated with (e.g., attached to) a particular article has been detected in proximity to or passing through the portal (e.g., portal 130, FIG. 1), thus indicating that the article may be leaving a controlled area (e.g., a retail store). Accordingly, the RFID tag detection algorithm may not provide the information to the inventory control system 230 immediately upon detection of the RFID tag in the first detection area (e.g., area 142, FIG. 1), but may perform further analyses of subsequently received RFID tag response signals from the RFID tag to determine (e.g., based on signal strengths and phase angles of the RFID tag response signals) when the RFID tag is in proximity to, approaching, is passing through, and/or has passed through the portal. In other words, the RFID tag detection algorithm may use RFID phase and signal strength measurements to determine motion of an RFID tag and its distance from the RFID tag reader 202 (e.g., its motion relative to and distance from the portal). For example, the information received in an RFID tag response signal may include an article identifier (e.g., a SKU of an article to which the responding RFID tag is attached), and the RFID tag detection algorithm may send article-identity-indicating information that indicates the identity of the article to the inventory control system 230, when it is determined that the RFID tag is in proximity to, approaching, is passing through, or has passed through the portal.

In addition, in an embodiment, the information received in an RFID tag response signal may include the stored transaction status of the item (e.g., transacted or non-transacted), and the RFID tag detection algorithm may indicate to the inventory control system 230 whether or not the article was properly purchased. In other words, the RFID tag reader 202 may report to the inventory control system 230 the transaction status stored in the RFID tag. In an embodiment, when the RFID tag reader 202 has reported to the inventory control system 230 that a non-transacted RFID tag is in proximity to, approaching, passing through, or has passed through the portal, the inventory control system 240 may cause a display (e.g., at a point-of-sale, office or other area) to display an alert, an image of a non-transacted item, and/or the article identifier (e.g., the SKU) associated with the RFID tag. The displayed alert alternatively may be initiated by the RFID tag reader 202. Either way, the displayed alert may apprise store and/or security personnel of a potential theft, and the personnel may implement responsive actions. In various embodiments, the RFID tag reader 202 may provide the transaction status information to the inventory control system 230, and the RFID tag reader 202 or inventory control system 230 may cause the alert/image/identifier to be displayed while the non-transacted RFID tag and article are located within either area 142 or within area 140. Implementation of an embodiment in which the report is produced by the RFID tag reader 202 and the alert/image/identifier is displayed while the non-transacted RFID tag is outside of area 140, but within area 142, enables store and/or security personnel to be alerted of a potential theft well in advance of the non-transacted RFID tag entering area 140, when it may be too late to respond.

Inventory control system 230 is configured to maintain inventory information regarding quantities of a plurality of articles that are present within a controlled area at which the EAS system 200 is installed (e.g., a retail store). In response to receiving article-identity-indicating information from the RFID tag reader 202 (and possibly the transaction status of the associated article), the inventory control system 230 may update the inventory information regarding a quantity of the article present in the controlled area, in an embodiment.

EAS tag reader 204 is configured to detect a presence of an EAS tag (e.g., EAS tag 112, FIG. 1) within a second detection area (e.g., area 140, FIG. 1) by producing an EAS tag energizing signal, and detecting an appropriate response from the EAS tag. In addition, EAS tag reader 204 is configured to receive the proximity signal 232 from the RFID tag reader 202, and to alter characteristics of an EAS tag energizing signal in response to receiving the proximity signal. EAS tag reader 204 includes an EAS tag detection processor 260, a transmitter 262, a transmit antenna 264, a receiver 266, a receive antenna 268, and signaling interface 270. The transmit antenna 264 (and possibly transmitter 262) are housed within transmit pedestal 209, and the receive antenna 268 (and possibly receiver 266) may be housed within receive pedestal 210.

EAS tag detection processor 260 includes one or more general or special purpose processors and associated memory and other circuitry, which enables EAS tag detection processor 260 to execute an EAS tag detection algorithm. According to an embodiment, the EAS tag detection algorithm includes invoking the transmitter 262 and transmit antenna 264 to radiate an EAS tag detection signal, and evaluating signals received via receive antenna 268 and receiver 266 to determine whether they are valid EAS tag response signals. When a valid EAS tag response signal is received (i.e., upon detecting an EAS tag within the detection area of EAS tag reader 204), EAS tag detection processor 260 produces a control signal, which causes alarm 206 to produce an audible alarm. In other embodiments, in addition to or instead of EAS tag reader 204 producing an alarm control signal, the RFID tag reader 202 or the inventory control system 230 may provide an alarm control signal to alarm 206 when a determination has been made that a non-transacted item is in proximity to, is approaching, is passing through, or has passed through the portal, as discussed previously. Alarm control signals from RFID tag reader 202 may be provided directly to alarm 206, for example, and alarm control signals from inventory control system 230 may be provided directly to alarm 206 or may be communicated through RFID tag reader 202 and/or EAS tag reader 204, in various embodiments.

As discussed previously, the EAS tag reader 204 may operate in at least two operational modes. In a first operational mode, the EAS tag reader 204 either bypasses production of the EAS tag detection signal or generates the EAS tag detection signal with first transmission characteristics, in various embodiments. When the EAS tag reader 204 receives the proximity signal 232 from the RFID tag reader 202 via signaling interface 270, the EAS tag reader 204 transitions to a second operational mode. In the second operational mode, the EAS tag reader 204 initiates production of the EAS tag detection signal (i.e., if the first operational mode involved not transmitting the EAS tag detection signal), or beginning to transmit the EAS tag detection signal with second and different transmission characteristics, in various embodiments. Transition between the various operational modes will be discussed in more detail later.

Figure 3:
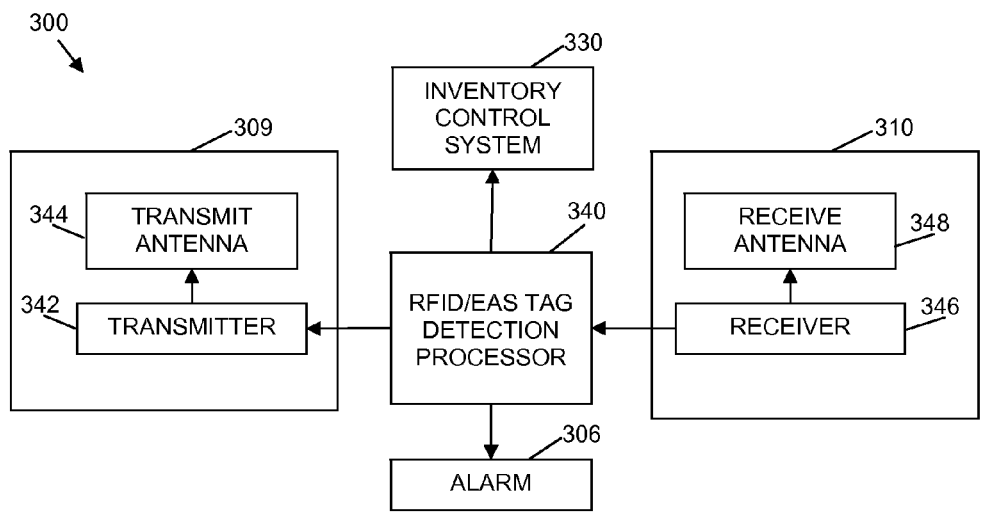
FIG. 3 is a simplified block diagram of an EAS system, in accordance with another example embodiment.

In the EAS system embodiment depicted in FIG. 2, the RFID tag detector 202 and the EAS tag detector 204 are implemented on distinct hardware, with a communications interface (including signaling interfaces 250, 270) between them. In an alternate embodiment, the RFID tag detector and the EAS tag detector may be implemented on at least partially shared hardware. For example, FIG. 3 is a simplified block diagram of an EAS system 300, in accordance with another example embodiment. EAS system 300 includes an RFID/

EAS tag detection processor 340, an alarm 306, and a pedestal pair consisting of a transmit pedestal 309 and a receive pedestal 310. In addition, RFID/EAS tag detection processor 340 may be communicatively coupled with an inventory control system 330.

RFID/EAS tag detection processor 340 includes one or more general or special purpose processors and associated memory and other circuitry, which enables RFID/EAS tag detection processor 340 to execute an RFID tag detection algorithm and an EAS tag detection algorithm, as discussed previously, or a single algorithm that includes the capabilities of both the RFID tag detection algorithm and the EAS tag detection algorithm, as discussed previously. These algorithms will be referred to collectively as an RFID/EAS tag detection algorithm.

By executing the RFID tag detection algorithm, RFID/EAS tag detection processor 340, in conjunction with transmitter 342, transmit antenna 344, receiver 346, and receive antenna 348, is configured to detect a presence of an RFID tag (e.g., object 115 or 116, FIG. 1) within a first detection area (e.g., area 142, FIG. 1), as discussed previously. When the RFID/EAS tag detection processor 340 is communicatively coupled with inventory control system 330, the RFID/EAS tag detection processor 340 may communicate article-identity-indicating information to the inventory control system 330 upon detection of an RFID tag exiting a controlled area, as discussed previously. In addition, by executing the EAS tag detection algorithm, and in response to detecting the RFID tag within the first detection area, RFID/EAS tag detection processor 340, in conjunction with transmitter 342, transmit antenna 344, receiver 346, and receive antenna 348, is configured to detect a presence of an EAS tag (e.g., EAS tag 112, FIG. 1) within a second detection area (e.g., area 140, FIG. 1). When an EAS tag is detected within the second detection area, RFID/EAS tag detection processor 340 produces a control signal, which causes alarm 306 to produce an audible alarm.

The transmit antenna 344 (and possibly transmitter 342) may be housed within transmit pedestal 309, and the receive antenna 348 (and possibly receiver 346) may be housed within receive pedestal 310. When the RFID tag detection algorithm and the EAS tag detection algorithm share the same transmitter 342, transmit antenna 344, receiver 346, and receive antenna 348, as shown in FIG. 3, the transmitter 342 should be capable of modulating signals in frequency ranges pertinent to both RFID tag detection and EAS tag detection, and the receiver 346 should be capable of demodulating signals in the RFID tag detection and EAS tag detection ranges, as well. In an alternate embodiment, although the RFID/EAS tag detection algorithm may be executed on a single processor, separate transmitters, transmit antennas, receivers, and receive antennas may be used for sending and receiving signals from the RFID and EAS tags (e.g., as implemented in the system of FIG. 1).

Figure 4:
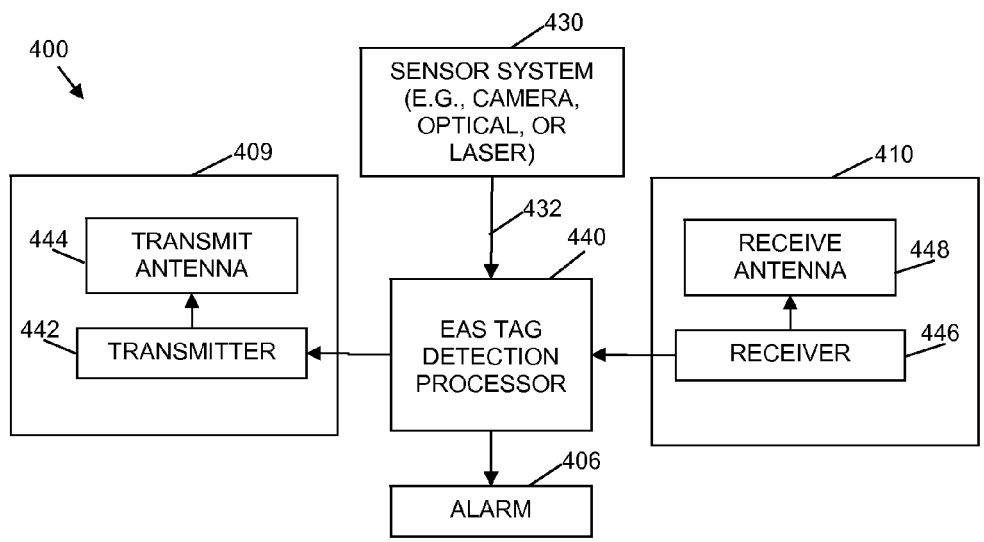
FIG. 4 is a simplified block diagram of an EAS system, in accordance with yet another example embodiment.

The embodiments of FIGS. 2 and 3 pertain to systems in which proximity detection is performed using an RFID tag reader. As mentioned previously, proximity detection may be performed using other proximity detection systems and methods, as well. FIG. 4 is a simplified block diagram of an EAS system 400 in which proximity detection is performed using a sensor-based system (rather than an RFID tag reader), in accordance with yet another example embodiment. EAS system 400 includes a sensor system 430, an EAS tag detection processor 440, an alarm 406, and a pedestal pair consisting of a transmit pedestal 409 and a receive pedestal 410. The transmit antenna 444 (and possibly transmitter 442) may be housed within transmit pedestal 409, and the receive antenna 448 (and possibly receiver 446) may be housed within receive pedestal 410.

Sensor system 430 may include any one or more types of sensors selected from a group consisting of a camera, optical sensor, and/or laser, which enable detection of the entry, presence, and/or movement of an object (e.g., object 116, 117, FIG. 1) within a first detection area (e.g., area 142, FIG. 1). The raw data produced by the sensor may be provided to EAS tag detection processor 440 for analysis of whether an object has entered, is present within, or is moving within the first detection area. Alternatively, the sensor system 430 may analyze the raw data produced by the sensor to detect the entry, presence, and/or movement of an object within the first detection area, and when such a detection is made, the sensor system 430 may send a proximity signal 432 to EAS tag detection processor 440.

EAS tag detection processor 440 includes one or more general or special purpose processors and associated memory and other circuitry, which enables EAS tag detection processor 440 to execute an EAS tag detection algorithm, as discussed previously. By executing the EAS tag detection algorithm, and in response to detecting the presence and/or movement of the object within the first detection area, EAS tag detection processor 440, in conjunction with transmitter 442, transmit antenna 444, receiver 446, and receive antenna 448, is configured to detect a presence of an EAS tag (e.g., EAS tag 112, FIG. 1) within a second detection area (e.g., area 140, FIG. 1). When an EAS tag is detected within the second detection area, RFID/EAS tag detection processor 440 produces a control signal, which causes alarm 406 to produce an audible alarm.

Figure 5:
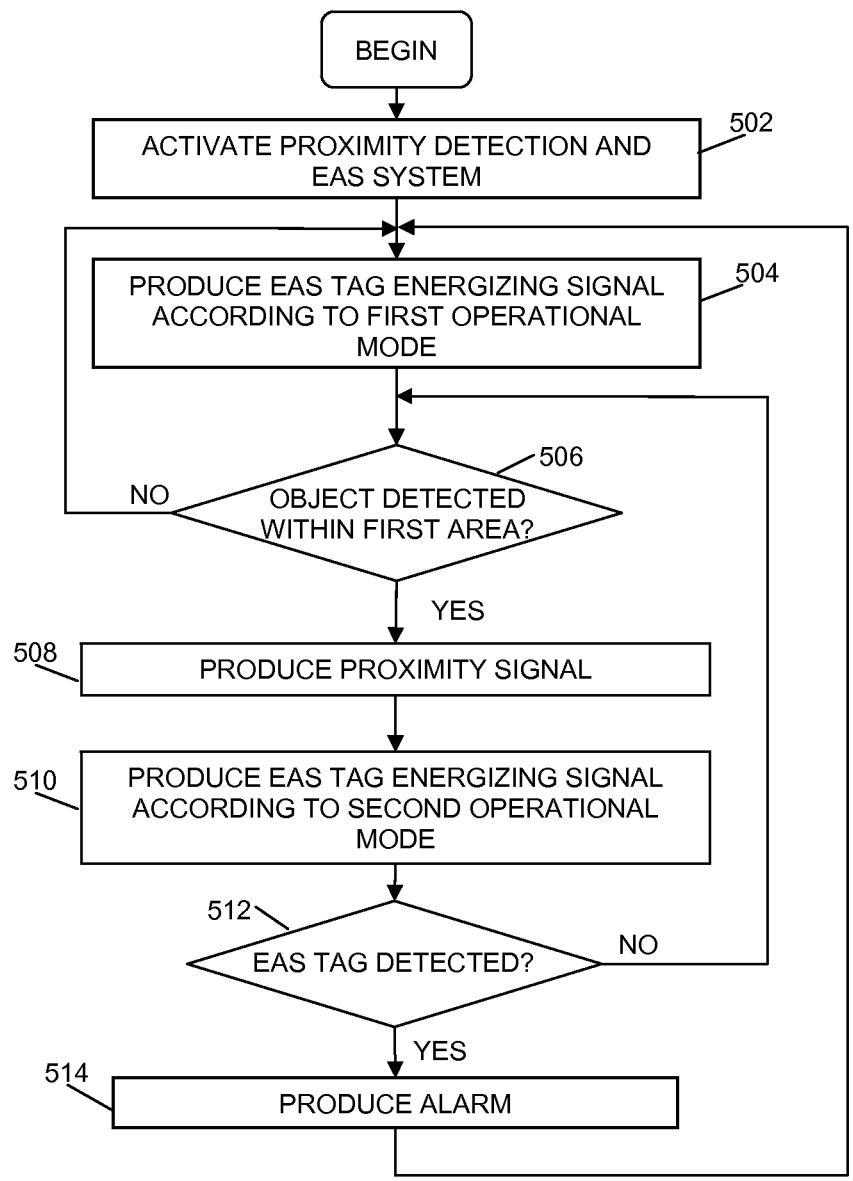
FIG. 5 is a flowchart of a method for performing tag proximity detection and EAS, in accordance with an example embodiment.

FIG. 5 is a flowchart of a method for performing tag proximity detection and EAS, in accordance with an example embodiment. The method begins, in block 502, when the proximity detection and EAS system is activated. Activation may include, for example, powering up the proximity detection and EAS system (e.g., system 100, FIG. 1), and waiting for the system to perform various bootup and initialization algorithms in order to reach an operational state.

In block 504, an EAS tag reader (e.g., EAS tag reader 104, FIG. 1) begins operation in a first operational mode. In accordance with an embodiment, in the first operational mode, the EAS tag reader bypasses production of an EAS tag detection signal. Referring also to FIG. 6, which illustrates EAS tag detection signals produced by the EAS tag reader in first and second operational modes, in accordance with various example embodiments, bypassing production of the EAS tag detection signal indicated by the absence of an EAS tag detection signal in graph 600, as discussed previously. In an alternate embodiment, in the first operational mode, the EAS tag reader produces an EAS tag detection signal having first transmission characteristics, such as EAS tag detection signal 612 in graph 610. EAS tag detection signal 612 is characterized by a duty cycle determined by the ratio of the duration 614 of each transmit pulse 616 to the time 618 between transmit pulses 616. In addition, EAS tag detection signal 612 is characterized by a pulse frequency (e.g., in a range of about 20 to 58 kHz, or some other value) and a pulse power level 619.

Referring again to FIG. 5, in block 506, a determination is made whether an object is detected within a first detection area (e.g., area 142, FIG. 1). As discussed in detail previously, this determination may be made by any of a variety of proximity detection systems, including but not limited to an RFID tag reader (i.e., when the "object" is an RFID tag), a camera, an optical sensor, and a laser system, to name a few. If no object is detected within the first detection area, the method iterates as shown, and the EAS tag reader remains in the first operational mode. When an object is detected within the first detection area, a proximity signal (e.g., proximity signal 232 or 432, FIGS. 2, 4) optionally may be produced, in block 508. For example, in a system embodiment in which the proximity detection system and the EAS tag reader utilize distinct hardware (e.g., as in systems 200 or 400, FIGS. 2, 4), the proximity signal may be produced by the proximity detection system to inform the EAS tag reader that the object has been detected. Alternatively, when the proximity detection and EAS tag detection are performed using shared hardware (e.g., as in system 300, FIG. 3), the proximity signal need not be produced, and detection of the object may result in a branch in an algorithm (e.g., an EAS tag detection algorithm).

In block 510, the EAS tag reader transitions to operation in a second operational mode in response to receipt of the proximity signal or merely in response to the detection of the object within the first detection area. In accordance with an embodiment in which the EAS tag reader initially bypasses production of an EAS tag detection signal while in the first mode, transition to the second operational mode includes the EAS tag reader initiating production of an EAS tag detection signal. Referring again to FIG. 6, the EAS tag reader may produce an EAS tag detection signal having particular transmission characteristics (e.g., any one of the EAS tag detection signals 612, 622, 632, 642 in graphs 610, 620, 630, 640). In an alternate embodiment in which the EAS tag reader transmitted an EAS tag detection signal while in the first mode (e.g., EAS tag detection signal 612 in graph 610), transition to the second operational mode includes the EAS tag reader initiating production of an EAS tag detection signal having different transmission characteristics from the EAS tag detection signal transmitted while in the first operational mode. For example, the EAS tag reader may transition from transmitting an EAS tag detection signal such as signal 612 with a first duty cycle, first frequency, and first power 619 to transmitting an EAS tag detection signal such as signal 622 (which has a higher pulse frequency), signal 632 (which has a longer duty cycle as indicated by the longer duration 634 of transmit pulses 636 relative to the time 638 between pulses 636), or signal 642 (which has a higher pulse power level 646 than the pulse power level 619 of EAS tag detection signal 612). Although the EAS tag detection signal transmitted in conjunction with the second operational mode may have only a single different transmit signal characteristic (e.g., only the duty cycle, pulse frequency or pulse power level is different), the EAS tag detection signal alternatively may have more than one different transmit signal characteristic, as well. According to an embodiment, the characteristics of the EAS tag detection signal transmitted in conjunction with the second operational mode are selected to increase the probability of detecting an EAS tag within range of the EAS tag reader, when compared with the probability of detection using an EAS tag detection signal having the first transmission characteristics.

Referring again to FIG. 5, a determination is made, in block 512, whether an EAS tag is detected within a second detection area (e.g., area 140, FIG. 1). According to an embodiment, this determination is made during a detection phase (e.g., when the EAS tag reader is not generating an EAS tag detection signal). For example, an EAS tag may be considered to have been detected when a signal produced by an EAS tag and received by the EAS tag reader meets predefined detection parameters (e.g., the detected signal has an appropriate frequency and is time-synchronized with the transmitter). When an EAS tag has not been detected, the method iterates as shown, and the EAS tag reader either remains in the second operational mode (while achieving regulatory compliance and while the object continues to be detected within the first detection area) or transitions back to the first operational mode (when the object is no longer detected within the first detection area). When an EAS tag has been detected within the second detection area, the EAS system may produce an audible alarm, in block 514. The method may then iterate as shown.

Figure 7:
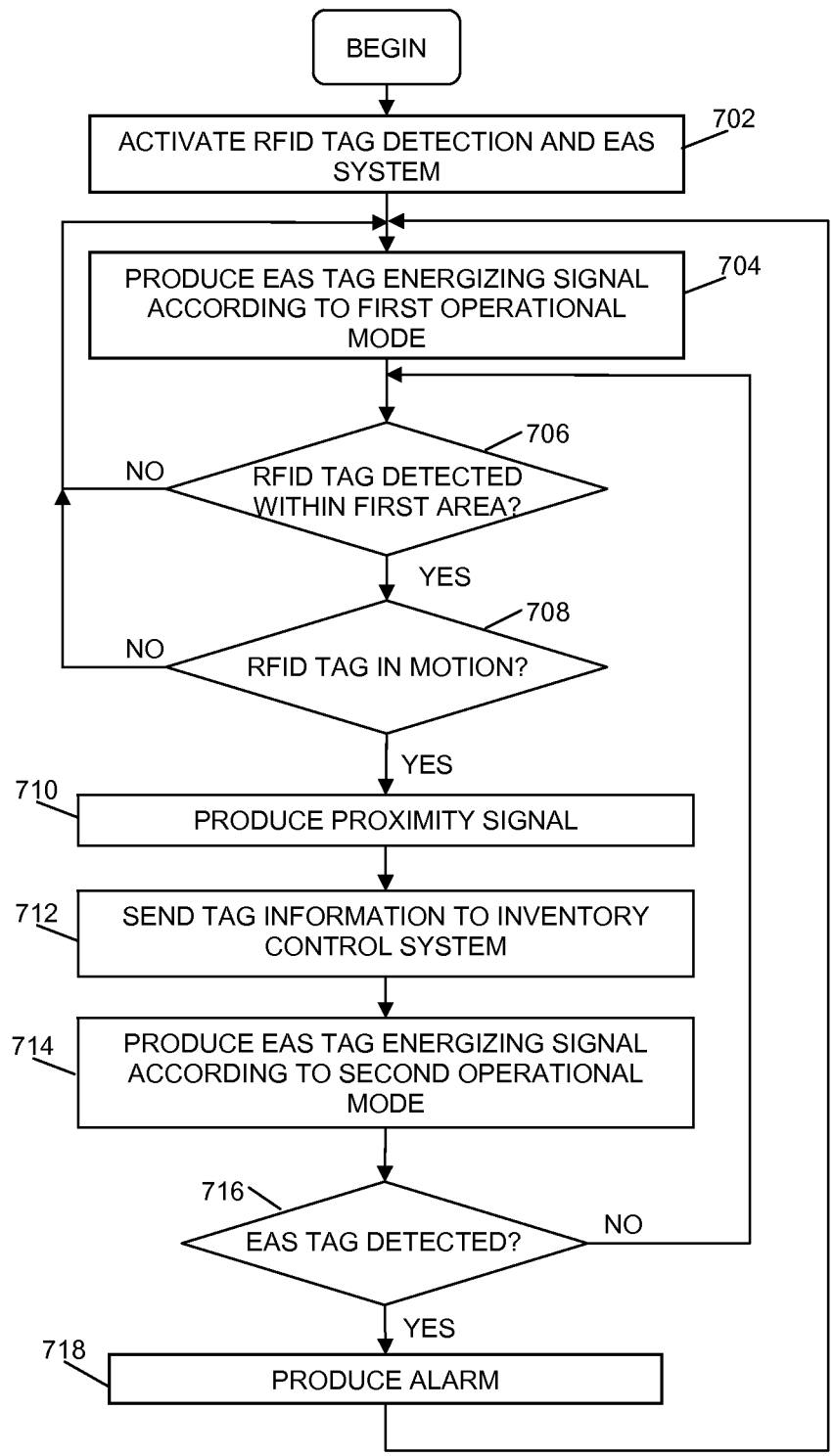
FIG. 7 is a flowchart of a method for detecting proximity of a Radio Frequency Identification (RFID) tag and an EAS tag, in accordance with an example embodiment.

The flowchart of FIG. 5 depicts a method for detecting proximity of an object and EAS tag that may utilize any of a variety of proximity detection techniques. As discussed in detail above, one such proximity detection technique is detection of the proximity of an RFID tag. FIG. 7 is a flowchart of a method for detecting proximity of an RFID tag and an EAS tag, in accordance with an example embodiment. The method of FIG. 7 has some similarities to the method of FIG. 5, with distinctions called out in more detail below.

The method begins, in block 702, when the proximity detection and EAS system is activated. Activation may include, for example, powering up the proximity detection and EAS system (e.g., system 100, FIG. 1), and waiting for the system to perform various bootup and initialization algorithms in order to reach an operational state. In block 704, an EAS tag reader (e.g., EAS tag reader 104, FIG. 1) begins operation in a first operational mode. In accordance with an embodiment, in the first operational mode, the EAS tag reader bypasses production of an EAS tag detection signal. In an alternate embodiment, in the first operational mode, the EAS tag reader produces an EAS tag detection signal having first transmission characteristics.

In block 706, a determination is made whether an RFID tag (e.g., object 115 or 116, FIG. 1) is detected within a first detection area (e.g., area 142, FIG. 1). This determination may be made by an RFID tag reader (e.g., RFID tag reader 202, FIG. 2), in an embodiment. If no RFID tag is detected within the first detection area, the method iterates as shown, and the EAS tag reader remains in the first operational mode. When an RFID tag is detected within the first detection area, a determination optionally is made, in block 708, whether the RFID tag is in motion. According to an embodiment, this determination may be made by comparing phase angles of received RFID tag response signals from the RFID tag, or by using other motion determination methods. When the RFID tag is not in motion, the method iterates as shown. In an alternate embodiment, block 708 is excluded from the method.

When the RFID tag is detected within the first detection area and, optionally, when the RFID tag is in motion, a proximity signal (e.g., proximity signal 232, FIG. 2) optionally may be produced, in block 710. For example, in a system embodiment in which the RFID tag reader and the EAS tag reader utilize distinct hardware (e.g., as in system 200, FIG. 2), the proximity signal may be produced by the RFID tag reader to inform the EAS tag reader that the RFID tag has been detected. Alternatively, when the RFID tag detection and EAS tag detection are performed using shared hardware (e.g., as in system 300, FIG. 3), the proximity signal need not be produced, and detection of the RFID tag may result in a branch in an algorithm (e.g., an EAS tag detection algorithm).

In block 712, the RFID tag reader may communicate article-identity-indicating information to an inventory control system (e.g., inventory control system 230, 330, FIGS. 2, 3), when the RFID tag reader determines that the RFID tag has exited a controlled area (e.g., a retail store). As was discussed previously and as will be discussed in more detail in conjunction with FIG. 8, the inventory control system may use the article-identity-indicating information to update inventory information regarding the quantity of the article within the controlled area, in an embodiment. In addition, according to an embodiment, the RFID tag reader may receive an indication from the RFID tag of a transaction status of the RFID tag (e.g., whether the RFID tag has a stored transaction status of "transacted" or "non-transacted"), and the RFID tag reader may provide the indication to the inventory control system. As discussed previously, when the transaction status is non-transacted, the inventory control system may cause an alert or an alarm to be produced. Alternatively, the RFID tag reader may cause an alert or an alarm to be produced when the transaction status is non-transacted.

In block 714, the EAS tag reader transitions to operation in a second operational mode in response to receipt of the proximity signal or merely in response to the detection of the RFID tag within the first detection area. In accordance with an embodiment in which the EAS tag reader initially bypasses production of an EAS tag detection signal while in the first mode, transition to the second operational mode includes the EAS tag reader initiating production of an EAS tag detection signal. In an alternate embodiment in which the EAS tag reader transmitted an EAS tag detection signal while in the first mode, transition to the second operational mode includes the EAS tag reader initiating production of an EAS tag detection signal having different transmission characteristics from the EAS tag detection signal transmitted while in the first operational mode.

A determination is made, in block 716, whether an EAS tag is detected within a second detection area (e.g., area 140, FIG. 1). According to an embodiment, this determination is made during a detection phase (e.g., when the EAS tag reader is not generating an EAS tag detection signal). For example, an EAS tag may be considered to have been detected when a signal produced by an EAS tag and received by the EAS tag reader meets predefined detection parameters. When an EAS tag has not been detected, the method iterates as shown, and the EAS tag reader either remains in the second operational mode (while achieving regulatory compliance and while the RFID tag continues to be detected within the first detection area) or transitions back to the first operational mode (when the RFID tag is no longer detected within the first detection area). When an EAS tag has been detected within the second detection area, the EAS system may produce an audible alarm, in block 718. The method may then iterate as shown.

As discussed previously, in an embodiment in which the proximity detection system is an RFID tag detection system, the RFID tag detection system may be operatively coupled with an inventory control system (e.g., inventory control system 230, 330, FIGS. 2, 3). In such an embodiment, the RFID tag reader may communicate article-identity-indicating information to the inventory control system, which indicates the identity of an article to which a detected RFID tag is attached, and the inventory control system may update inventory information regarding the quantity of the article in the retail store, accordingly.

Figure 8:
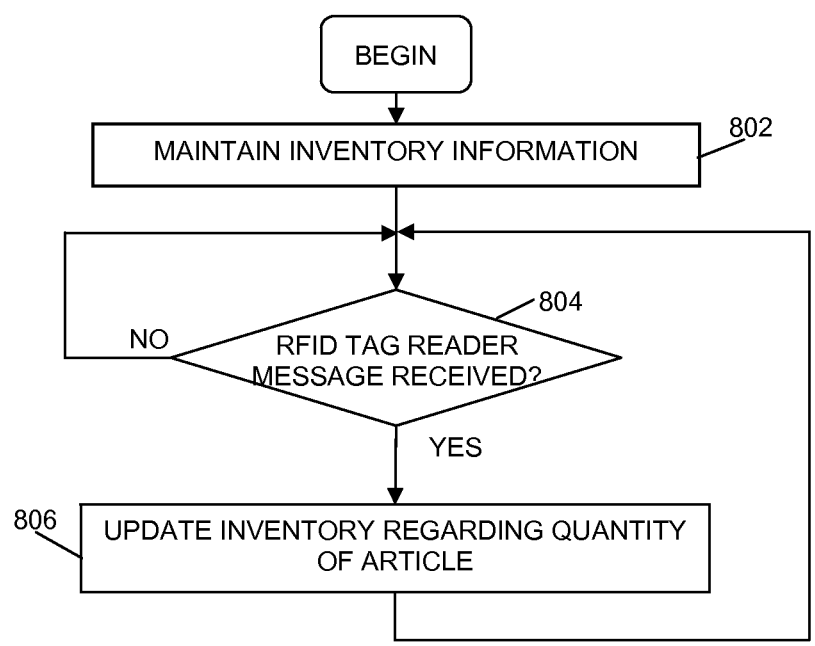
FIG. 8 is a flowchart of a method for updating inventory information, in accordance with an example embodiment.

FIG. 8 is a flowchart of a method for updating inventory information, in accordance with an example embodiment. The method may be performed, for example, by an inventory control system (e.g., inventory control system 230, 330, FIGS. 2, 3) that is communicatively coupled with an RFID tag reader. The method begins, in block 802, by maintaining inventory information for one or more articles (e.g., articles that may be identified, for example, by a unique SKU). The inventory information may reflect, for example, how many of each article are present within a controlled area (e.g., a retail store).

In block 804, a determination is made whether a message has been received from an RFID tag reader indicating that an RFID tag associated with a particular article has been detected leaving the controlled area. According to an embodiment, the message may include article-identity-indicating information derived from an RFID tag response signal. The article-identity-indicating information may be a value that actually identifies the article (e.g., a unique SKU) or a value that may be correlated with other information to derive the identity of the article. When no message has been received from the RFID tag reader, the method iterates as shown.

When a message has been received from an RFID tag reader indicating that an RFID tag associated with a particular item has been detected leaving the controlled area, then inventory information regarding a quantity of the article may be updated, in block 806. According to an embodiment, this may include decrementing a current quantity of the item by one, for example. The method then iterates as shown.

The foregoing detailed description is merely exemplary in nature and is not intended to limit the invention or the application and uses of the invention. Furthermore, there is no intention to be bound by any expressed or implied theory presented in the preceding technical field, background, brief summary or detailed description.

For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in some of the figures may be exaggerated relative to other elements or regions of the same or other figures to help improve understanding of embodiments of the invention.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation or use in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus. It is to be understood that the embodiments of the invention described herein may be used, for example, in other orientations than those illustrated or otherwise described herein. The term "coupled," as used herein, is defined as directly or indirectly connected in an electrical or non-electrical manner.

An embodiment includes a reader system comprising a proximity sensor system and an EAS tag reader, communicatively coupled to the proximity sensor system. The proximity sensor system is configured to detect a presence of an object within a first area, and to generate a proximity signal in response to detecting the object within the first area. The EAS tag reader is configured to make a transition from a first operational mode to a second operational mode in response to receiving the proximity signal from the proximity sensor system. The transition includes the EAS tag reader altering production of an EAS tag detection signal.

Another embodiment includes a reader system comprising an RFID tag reader and an EAS tag reader communicatively coupled to the RFID tag reader. The RFID tag reader is configured to detect a presence of an RFID tag within a first area, and to generate a proximity signal in response to detecting the RFID tag within the first area. The EAS tag reader is configured to detect a presence of an EAS tag within a second area by producing an EAS tag detection signal. The EAS tag reader is further configured to alter characteristics of the EAS tag detection signal in response to receiving the proximity signal from the RFID tag reader.

Yet another embodiment includes a reader system comprising a processing system and an RF system operably coupled with the processing system. The processing system is configured to detect a presence of an object using an object detection technique other than EAS, and to make a transition from a first operational mode to a second operational mode in response to detecting the presence of the object. The transition includes altering production of an EAS tag detection signal. The RF system is configured to radiate the EAS tag detection signal.

Yet another embodiment includes a method for detecting proximity of an EAS tag. The method comprises the steps of detecting, by a proximity detection system, a presence of an object within a first area, and altering characteristics of an EAS tag detection signal that is produced by an EAS tag reader in response to detecting the proximity of the object.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A reader system comprising:
    a proximity sensor system configured to detect a presence of an object within a first area, and to generate a proximity signal in response to detecting the object within the first area; and
    an electronic article surveillance (EAS) tag reader communicatively coupled to the proximity sensor system, and configured to make a transition from a first operational mode to a second operational mode in response to receiving the proximity signal from the proximity sensor system, wherein the transition includes the EAS tag reader altering production of an EAS tag detection signal;
    wherein the proximity sensor system comprises a radio frequency identification (RFID) tag reader, and the reader system further comprises:
    the object in a form of an RFID tag configured to interact with the RFID tag reader to enable the RFID tag reader to determine whether the RFID tag is within the first area, wherein the first area corresponds to an RF range of the RFID tag reader; and
        an EAS tag configured to interact with the EAS tag reader by responding to the EAS tag detection signal, thus enabling the EAS tag reader to determine whether the EAS tag is within a second area, wherein the second area corresponds to an RF range of the EAS tag reader.

2. The reader system of claim 1, wherein the EAS tag reader is configured to alter characteristics of the EAS tag detection signal by transitioning from bypassing production of the EAS tag detection signal in the first operational mode to producing the EAS tag detection signal in the second operational mode.

3. The reader system of claim 1, wherein the EAS tag reader is configured to alter characteristics of the EAS tag detection signal by transitioning from producing the EAS tag detection signal with first transmission characteristics in the first operational mode to producing the EAS tag detection signal with second transmission characteristics that are different from the first transmission characteristics in the second operational mode.

4. The reader system of claim 1, wherein the RFID tag reader is configured to receive an indication of a transaction status of the RFID tag, and when the transaction status is non-transacted, to cause an alert or an alarm to be produced.

5. The reader system of claim 1, wherein the proximity sensor system comprises a radio frequency identification (RFID) tag reader, and the reader system further comprises:
    a container selected from a group consisting of a bag, a box, a package, a crate, and a pallet; and
    the object in a form of an RFID tag integrated with the container and configured to interact with the RFID tag reader to enable the RFID tag reader to determine whether the RFID tag is within the first area, wherein the first area corresponds to an RF range of the RFID tag reader.

6. A reader system comprising:
    a radio frequency identification (RFID) tag reader configured to detect a presence of an RFID tag within a first area, and to generate a proximity signal in response to detecting the RFID tag within the first area; and
    an electronic article surveillance (EAS) tag reader communicatively coupled to the RFID tag reader, and configured to detect a presence of an EAS tag within a second area by producing an EAS tag detection signal, wherein the EAS tag reader is further configured to alter characteristics of the EAS tag detection signal in response to receiving the proximity signal from the RFID tag reader;
    an inventory control system communicatively coupled with the reader system, wherein the inventory control system is configured to maintain inventory information regarding quantities of a plurality of articles that are present at a facility at which the reader system is installed,
    wherein the RFID tag reader is further configured to receive data from the RFID tag that indicates an identity of an article of the plurality of articles, and to provide article-identity-indicating information that indicates the identity of the article to the inventory control system, and
    wherein the inventory control system is further configured to update the inventory information regarding a quantity of the article in response to receiving the article-identity-indicating information.

7. The reader system of claim 6, wherein the RFID tag reader is configured to receive an indication of a transaction status of the RFID tag and to provide the indication to the inventory control system, and when the transaction status is non-transacted, the inventory control system is configured to cause an alert or an alarm to be produced.

8. The reader system of claim 6, wherein the RFID tag reader is configured to receive an indication of a transaction status of the RFID tag, and when the transaction status is non-transacted, to cause an alert or an alarm to be produced.

9. The reader system of claim 6, wherein the RFID tag reader is further configured to detect whether the RFID tag is in motion, and wherein the RFID tag reader is configured to produce the proximity signal only upon detecting that the RFID tag is in motion.

10. A method for detecting a proximity of an electronic article surveillance (EAS) tag, the method comprising steps of:
   detecting, by a proximity detection system, a presence of an object within a first area; and
   altering characteristics of an EAS tag detection signal that is produced by an EAS tag reader in response to detecting the proximity of the object;
   wherein:
   the first transmission characteristics include a first EAS interrogation pulse frequency, a first EAS interrogation pulse duty cycle, and a first EAS interrogation pulse signal power; and
   the second transmission characteristics include a second EAS interrogation pulse frequency, a second EAS interrogation pulse duty cycle, and a second EAS interrogation pulse signal power, and wherein
   at least one of the second EAS interrogation pulse frequency, the second EAS interrogation pulse duty cycle, and the second EAS interrogation pulse signal power is higher than at least one of the first EAS interrogation pulse frequency, the first EAS interrogation pulse duty cycle, and the first EAS interrogation pulse signal power.

11. The method of claim 10, further comprising the steps of:
   generating, by the proximity detection system, a proximity signal in response to detecting the object within the first area; and
   receiving the proximity signal by the EAS tag reader, wherein the EAS tag reader alters the characteristics of the EAS tag detection signal in response to receiving the proximity signal.

12. The method of claim 10, wherein the step of altering the characteristics of the EAS tag detection signal includes transitioning from a first mode of operation in which production of the EAS tag detection signal is bypassed to a second mode of operation in which the EAS tag detection signal is produced.

13. The method of claim 10, wherein the step of altering the characteristics of the EAS tag detection signal includes transitioning from a first mode of operation in which the EAS tag detection signal is produced with first transmission characteristics to a second mode of operation in which the EAS tag detection signal is produced with second transmission characteristics, wherein at least one of the second transmission characteristics are different from at least one of the first transmission characteristics.

14. The method of claim 10, wherein the proximity detection system comprises a radio frequency identification (RFID) tag reader, and the method further comprises the steps of:
   receiving, by the RFID tag reader, an indication from the RFID tag of a transaction status of the RFID tag; and
   when the transaction status is non-transacted, the RFID tag reader causing an alert or an alarm to be produced.

15. The method of claim 14, further comprising the steps of:
   maintaining, by an inventory control system, inventory information regarding quantities of a plurality of articles that are present at a facility;
   receiving, by the RFID tag reader, data from the RFID tag that indicates an identity of an article of the plurality of articles;
   providing, by the RFID tag reader to the inventory control system, article-identity-indicating information that indicates the identity of the article; and
   updating, by the inventory control system, the inventory information regarding a quantity of the article in response to receiving the article-identity-indicating information.

16. The method of claim 15, further comprising the steps of:
   receiving, by the RFID tag reader, an indication from the RFID tag of a transaction status of the RFID tag;
   providing, by the RFID tag reader, the indication to the inventory control system; and
   when the transaction status is non-transacted, the inventory control system causing an alert or an alarm to be produced.

17. The method of claim 14, further comprising the step of:
   detecting, by the RFID tag reader, whether the RFID tag is in motion;
   generating, by the RFID tag reader, a proximity signal in response to detecting the RFID tag within the first area and detecting that the RFID tag is in motion; and
   receiving the proximity signal by the EAS tag reader, wherein the EAS tag reader alters the characteristics of the EAS tag detection signal in response to receiving the proximity signal.

* * * * *